United States Patent [19]

Hasegawa et al.

[11] Patent Number: 4,568,951

[45] Date of Patent: Feb. 4, 1986

[54] THERMAL PRINTING WITH NORMAL AND REVERSE IMAGE

[75] Inventors: Takanori Hasegawa; Kouichi Uchiyama, both of Shinbashi, Japan

[73] Assignee: Riso Kagaku Corporation, Tokyo, Japan

[21] Appl. No.: 627,005

[22] Filed: Jul. 2, 1984

[30] Foreign Application Priority Data

Jul. 4, 1983 [JP] Japan ................................ 58-122230

[51] Int. Cl.⁴ ........................ G01D 15/24; B41F 19/00

[52] U.S. Cl. ................................ 346/76 PH; 101/470; 400/323.1

[58] Field of Search ................ 346/76 R, 76 PH, 151, 346/135.1; 219/210 PH; 400/120, 323, 323.1, 84, 85, 466, 697.1; 101/470–471, 465–467, 90, 113, 131–134.5; 358/285

[56] References Cited

U.S. PATENT DOCUMENTS

| | | | |
|---|---|---|---|
| 4,134,341 | 1/1979 | Weigele et al. | 101/470 |
| 4,343,012 | 8/1982 | Knapp | 400/323 |
| 4,409,597 | 10/1983 | Nakamura et al. | 346/76 PH |
| 4,491,853 | 1/1985 | Hayashi et al. | 346/76 PH |

*Primary Examiner*—E. A. Goldberg
*Assistant Examiner*—A. Evans
*Attorney, Agent, or Firm*—Birch, Stewart, Kolasch & Birch

[57] ABSTRACT

A thermal printing system which makes printing by selected ones of a plurality of thermal dot generating means being actuated at selected dot areas in a matrix of dot areas according to input formation for printing provides printing in either normal image forming mode or reversed mirror image forming mode by the relative order of sequential decoding of the input information for printing and of sequential actuation of the thermal dot generating means according to the decoded printing information signal being switched over in two ways.

6 Claims, 10 Drawing Figures

THERMAL PRINTING WITH NORMAL AND REVERSE IMAGE

BACKGROUND OF THE INVENTION

The present invention relates to a thermal printing system which forms picture images on a printing sheet by using a thermal printing head, and more particularly relates to a thermal printing system of such a type which can selectively either form direct images which are the usual way around or can form reversed or mirror type images.

Thermally perforable stencils for use in thermal printing are known in various forms. One such type, an example of which is schematically shown in perspective in FIG. 7 of the appended drawings (the characters inscribed on this stencil should be ignored with respect to the immediately following descriptions), consists of a sheet F of thermoplastic or heat resolving film made, for example, of polyvinyl chloride copolymer, polyethylene telefterate, polypropylene or the like adhered against a sheet P of porous laminar material such as Japanese paper which can transmit ink through itself while supporting the thermally perforable thermoplastic material sheet F in an overall manner. A compound stencil sheet of this type can be thermally perforated in a desired perforation pattern by application of heat to parts of it, arranged in said pattern, on its side on which is situated the thermally perforable thermoplastic sheet F; when this happens, these parts of the sheet F of thermoplastic material melt and curl up and effectively disappear, leaving only the backing sheet P of porous material present in these heated up portions of the compound stencil sheet, supporting the non perforated portions of the thermoplastic sheet F therearound. Thus the desired pattern is reproduced on the compound stencil sheet in the form of local perforations. Subsequently this perforated stencil sheet can be mounted in a stencil printing device, and then printing ink can be applied to its side on which is situated the porous laminar material sheet P, while its other side on which is situated the thermally perforable thermoplastic sheet F is pressed against paper to be printed on: when this is done, the printing ink passes through the thermally perforated parts of the stencil sheet in which only the porous laminar sheet P remains and inks the printing paper, while on the other hand the non perforated parts of the stencil sheet in which still the thermoplastic sheet F is locally present intercept the passage of the printing ink.

Now, one per se well known way for preparing and perforating such a thermally perforable stencil sheet has been to press the stencil sheet against an original on which the pattern to be reproduced is inscribed in a dark pattern against a light ground, and then to flash infrared radiation against the original through the stencil sheet: thus the dark portions of the original become heated up and transfer their heat to the corresponding portions of the stencil sheet, thus bringing them above their critical temperature at which the thermoplastic sheet F thereof melts and causing them to be perforated. In such a utilization mode, as will be readily apparent, when later printing is performed as indicated above with the side of the perforated stencil sheet on which is situated the thermally perforable thermoplastic sheet F being contacted against the printing paper and with the other side of the perforated stencil sheet charged with printing ink, then the image reproduced on the printing paper is an exact copy of the original and is the same way around as the original, so no problem is caused.

However, another manner for using such a thermally perforable stencil sheet could be to directly perforate it by direct application of heat from a heat pattern generating unit such as a thermal printer head of a thermal printing system. In fact, thermal printers are per se well known, in which a printer head comprises a plurality of electrically operated thermal dot generating elements. Such printers are used nowadays in typewriters, word processors, and facsimile machines. If such a printer is being used for printing on thermally markable paper, no printing ribbon is used but instead the head is pressed against such paper with the dot generating elements opposing the paper, and then, as the head is moved along the paper and the dot generating elements are rapidly selectively heated up by selective supply of electrical energy to them in appropriate patterns and timings, patterns and characters are printed on the paper in a dot matrix fashion. (The printer may also be used for printing on ordinary paper, in which case a thermal printing ribbon is interposed between the printing head and the paper). As a matter of course, such printers as available currently are so structured, and the patterns and timings for heating of their dot generating elements are so set up, that they produce characters the right way around on the printing paper, i.e. they do not produce mirror image characters but produce hard copy with the characters thereon the usual way round. Now, if such a thermally perforable stencil sheet as described above were to be directly inserted into such a thermal printer with the side of the stencil sheet on which is situated the thermally perforable thermoplastic material sheet F opposing the printing head, then by operation of the printer as described above the stencil sheet could be directly perforated. However, it will be clear based upon the above explanations that, if this was done and printing was performed from the stencil sheet which had been perforated as above in the manner detailed previously, the patterns produced on the final printing paper would be reversed from the first original patterns produced by the printing head on the stencil sheet, in other words would be the mirror images of the images that would have been produced on thermal paper if such had been fitted into the thermal printer rather than the thermally perforable stencil sheet. In particular, writing would not be readable but would be backwards. This fact has up till now been an obstacle to this type of direct perforation of a thermal stencil sheet. Nor can the problem be resolved by reversing the orientation in which the stencil sheet is fitted into the thermal printer, because if the side of the perforated stencil sheet on which is situated the porous laminar material sheet P is the one opposing the thermal printing head, the heating up of the thermal dot generating elements will not be effective for properly perforating the thermally perforable sheet F, because of the heat capacity of the porous laminar material sheet P interposed therebetween which prevents proper and accurate perforation.

SUMMARY OF THE INVENTION

Accordingly, it is the primary object of the present invention to provide a thermal printing system which can function both in a normal hard copy printing mode and in a thermal stencil perforating mode.

It is a further object of the present invention to provide such a thermal printing system which can selectively either print normal right way round images or reversed mirror images.

It is a further object of the present invention to provide such a thermal printing system which can be easily controlled between its normal image forming mode and its reverse image forming mode.

It is a further object of the present invention to provide such a thermal printing system which is structured as a typewriter.

It is a further object of the present invention to provide such a thermal printing system which is structured as a copying machine.

According to the most general aspect of the present invention, these and other objects are accomplished by a thermal printing system for printing either the normal or the reverse way round according to sequential picking up of information for printing, comprising a means for scanning along a primary scanning line over a thermal printing sheet and for thermally imprinting said sheet with dot marks at appropriate timings relative to said scanning process; further comprising a means for selectively controlling relative direction between said sequential picking up of information for printing and the scanning direction along said primary scanning line of said scanning over said thermal printing sheet between two opposite directions.

According to such a structure, according to the setting of said means for selectively controlling the scanning direction along said primary scanning line of said scanning of said thermal printing sheet, the pattern formed by the marks on said sheet may be controlled to be, overall, either a normal right way round image or a reversed mirror image, since the marks are imprinted at the same timing whichever is the direction of scanning along said primary scanning direction. Hence this thermal printing system can function both in a normal hard copy printing mode and in a thermal stencil perforating mode, and can selectively either print normal right way round images or reversed mirror images. The scanning along the primary scanning line may be either performed mechanically, as in the case that a single thermal printing head is used which is reciprocated to and fro horizontally as in a thermal printer or typewriter to form dot matrix type images, or may be performed electronically, as in the case that a number of thermal printing elements which do not move are provided extending along said primary scanning direction, as in a thermal copying machine or a facsimile machine.

BRIEF DESCRIPTION OF THE DRAWINGS

The present invention will now be shown and described with reference to the preferred embodiments thereof, and with reference to the illustrative drawings. It should be clearly understood, however, that the description of the embodiments, and the drawings, are all of them given purely for the purposes of explanation and exemplification only, and are none of them intended to be limitative of the scope of the present invention in any way, since the scope of the present invention is to be defined solely by the legitimate and proper scope of the appended claims. In the drawings, like parts and features are denoted by like reference symbols in the various figures thereof, and:

DESCRIPTION OF THE PREFERRED EMBODIMENTS

Figure 1:
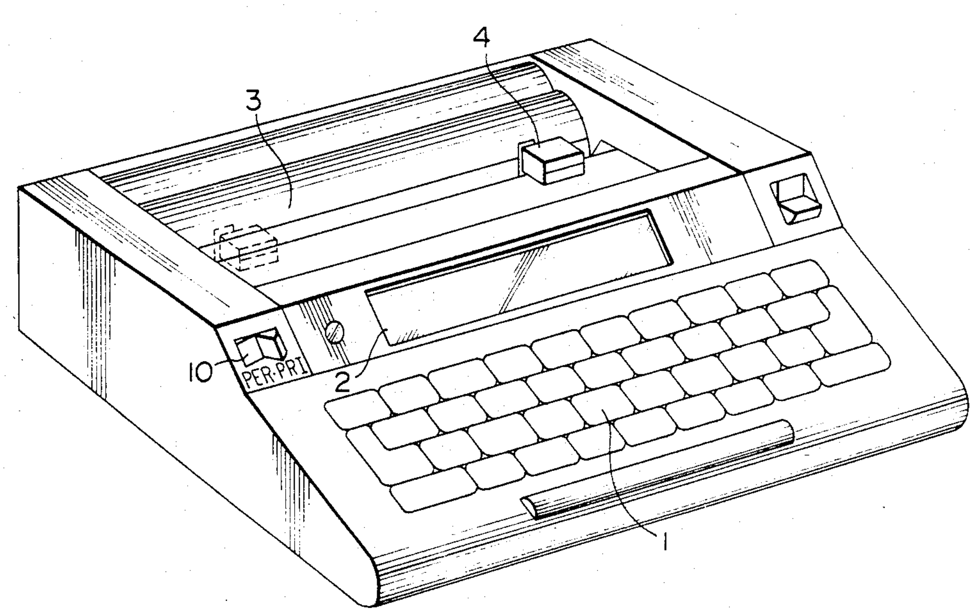
FIG. 1 is a schematic external perspective view of a typewriter type thermal printer which is a first preferred embodiment of the thermal printing system of the present invention.

The present invention will now be described with reference to the preferred embodiments thereof, and with reference to the appended drawings. Referring to FIG. 1, the reference numeral 1 denotes a keyboard which comprises a plurality of finger-pressable keys which represent symbols (letters, numerals, and other symbols), and 2 is a display device (such as an LCD type or a photoelectric tube type) for electronically displaying to the operator symbols which have been inputted to the typewriter via the keys of the keyboard 1. A cylindrical platen 3 extends along the lateral direction of the typewriter, and a thermal printing head 4 of a per se well known sort is arranged to be scanningly movable along said lateral direction, parallel to and opposing a generatrix of the cylindrical surface of said platen 3, between a first position to the left as seen in FIG. 1 as shown by dashed lines and a second position to the right as shown by solid lines; this linear direction will hereinafter be called the primary scanning direction of the printing head 4.

Figure 5:
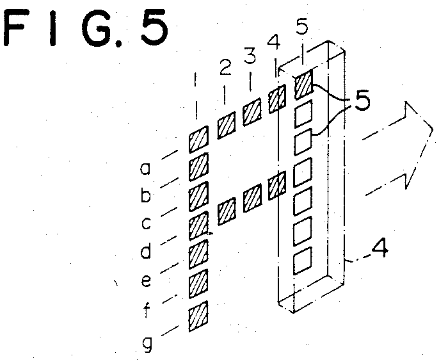
FIG. 5 is an illustrative diagram showing the individual dots of a letter "F" as being formed and arranged on the paper by the printing head of the printer of FIG. 1 (shown schematically by dot-dashed lines) during normal printing when a right way round image is being formed and the printing head is being moved to the right in the figure.
Figure 6:
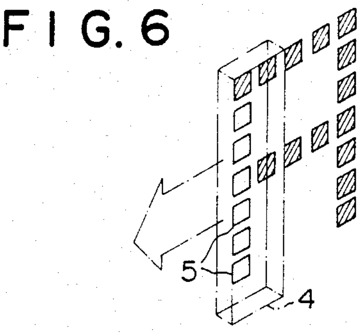
FIG. 6 is an illustrative diagram, similar to FIG. 5, showing the individual dots of a letter "F" as being formed and arranged on the paper (or stencil master) by the printing head of the printer of FIG. 1 during reverse printing when a mirror image is being formed and the printing head is being moved to the left in the figure.

In FIGS. 5 and 6, the thermal printing head 4 is schematically shown as a cuboid block by the dot-dashed lines. This head 4 comprises a plurality (seven in the shown embodiment) of thermal dot generating elements 5 arranged at equal intervals vertically as seen in the figure, i.e., with respect to the platen 3, arranged in a direction perpendicular to the generatrices of the cylindrical surface thereof and thus perpendicular to the primary scanning direction. Selective supply of electrical energy to these thermal dot generating elements 5 is provided from a control system which is schematically illustrated in FIG. 2, and when such electrical energy is supplied to one of the dot generating elements 5 said element 5 very quickly becomes hot and causes a mark to be thermally impressed on a corresponding position of a thermally markable sheet wrapped around the platen 3 and opposed to the head 4 and the elements 5, as will be explained later.

Figure 2:
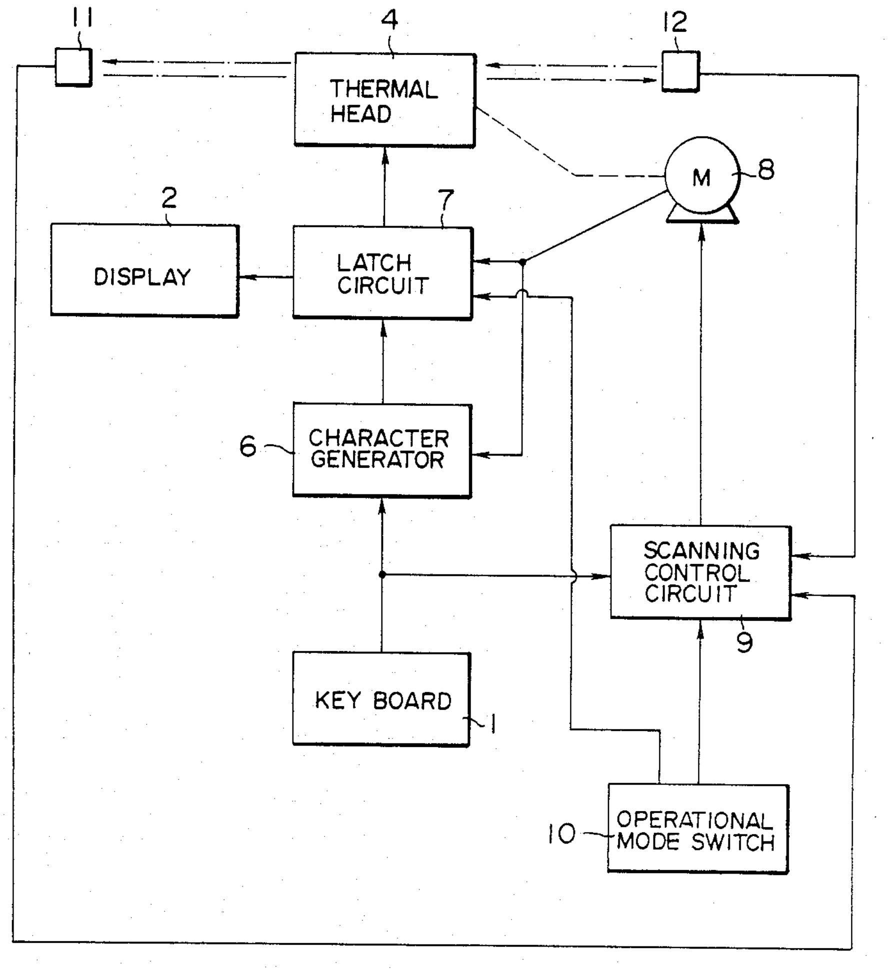
FIG. 2 is a block diagram of a control system incorporated in the typewriter of FIG. 1.

Referring to FIG. 2, the control system comprises a character generator 6 which stores information representative of dot matrix patterns appropriate to each of the keys of the keyboard 1. Whenever a key of the keyboard 1 is depressed by the operator, a signal is sent from the keyboard 1 to the character generator 6, and this causes a series of stored information signals corresponding to the dot matrix pattern of the character corresponding to said key to be outputted from the character generator 6 to a latch circuit 7. In the case, for example, of a character "F" as shown in FIG. 5, when a key corresponding to the character "F" is depressed, the character generator 6 may generate: at a first instant ON signals in all of seven channels a through g, at a second instant ON signals only in channels a and d, at a third and a fourth instant similarly ON signals only in channels a and d, and at a fifth instand an ON signal only in channel a, these first to fifth instants being time shifted in sequence so that information for printing is supplied as a sequential flow of a kind of digital information. The latch circuit 7 temporarily retains this series of dot matrix pattern information signals, and the latch circuit 7 outputs an information signal representative of the dot matrix pattern both to the display 2 and to the thermal printing head 4 with a certain latching function. Generally it may be desirable that the latching function for the display 2 is to retain the series of dot matrix pattern information signals for each character corresponding to each depression of the keys so that each character is displayed on the display 2 at an instant as a whole when each key is depressed. However, any other latching mode may be employed if required. The laching function for the series of dot matrix pattern information signals to be outputted towards the thermal printing head may desirably be a combination of various modes each to be selectively put into operation in the course of typewriting operation. One mode will be only to latch each instant for each ON or OFF information signals for a set of parallely arranged elements such as channels a through g in FIG. 5 so that the thermal dot generating elements 5 are selectively energized or not energized as the head 4 is steppedly moved. Another mode will be to temporarily retain transfer of the series of dot matrix pattern information signals while the head is carried back from a line end position along the axis of the platen 3 to a line start position axially opposite to said line end position with a simultaneous stepped feed rotation of the platen 3 or the head is held for a moment at the line end position to allow the platen to make a stepped feed rotation so that the head is next scanned for the printing of the next line in the direction opposite to the direction in which the head was scanned for the printing of the preceding line. Still another mode will be to retain transfer of the series of dot matrix pattern information signals until they are accumulated to provide a full line printing, and then transfer the accumulated one full line dot matrix pattern information signals to the thermal printing head 4 as a series of signals. Still another modification of such a latching function mode is to let the operator manually control the commencement of signal transfer to the thermal printing head so that he or she can have a chance to confirm that his or her key operation was correct before the generally not correctable thermal printing or perforation is performed.

The information signal thus fed to the display 2 causes said display 2 to show a pattern corresponding to the character on the key which was depressed, so that the operator can verify it, but this is not directly relevant to the gist of the present invention. The information signals fed to the thermal printing head 4, on the other hand, cause selected appropriate ones of the thermal dot generating elements 5 to become heated up at appropriate timings, while meanwhile the thermal printing head 4 is moved by the stepping motor 8 in its aforesaid primary scanning direction, either to the right or to the left as will be explained shortly. Thus, the rapid heating up and cooling down of the thermal dot generating elements 5, synchronized with the sideways motion of the thermal printing head 4, causes a set of marks to become thermally impressed on a thermally markable sheet wrapped around the platen 3 and opposed to the head 4 in a dot matrix manner, in a pattern corresponding to the pattern stored in the character generator 6 which corresponded to the key of the keyboard 1 which was depressed. In FIGS. 5 and 6 the inscribing of a letter "F" by the printing head 4 is shown, during operation of the typewriter in its two operational modes.

Figure 3:
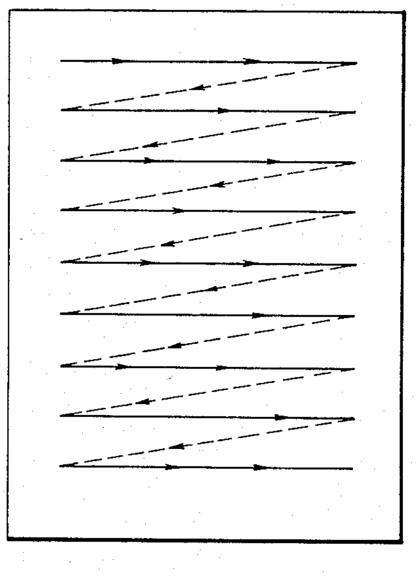
FIG. 3 is an illustrative diagram showing the movement of the printing head of the printer of FIG. 1 with respect to paper fitted thereinto, during normal printing when a right way round image is being formed.

The control system of FIG. 2 further comprises a scanning control circuit 9. This circuit 9 is for controlling the operation of the stepping motor 8, and it receives information from a manually operated operational mode switch 10 (also see FIG. 1) mounted on the front of the typewriter as to whether normal or reverse printing mode is required. The detailed construction of this scanning control circuit 9 will not be shown or detailed in this specification because, based upon the functional descriptions made herein, various possibilities therefor will be apparent to one of ordinary skill in the relevant art. When the operational mode switch 10 is manually set by the operator of the typewriter to its position for normal printing mode, in which case the sheet which is fed into the typewriter and is present between the platen 3 and the printing head 4 either is plain paper (in which case a thermal ribbon, not shown, is also interposingly used in a per se well known manner) or is thermal paper, then after the "carrier return" key on the keyboard 1 is pressed the printing head 4 is set to its first position on the left as shown in FIG. 1 by the dashed lines (to which it is controlled by a first limit switch, not shown in the figures), and as the printing process of a line proceeds the printing head 4 is moved from the left to the right along the primary scanning direction (i.e. horizontally) with, as described above, the thermal dot generating elements 5 being selectively and appropriately heated up by supply of electrical current thereto from the latch circuit 7 at appropriate timings. This motion of the printing head 4 is accomplished by the scanning control circuit 9 supplying actuating electrical energy to the forward motion terminal of the scanning motor 8, so as to drive the printing head 4 at a predetermined speed along the printing line on the paper. The patterns stored in the character generator 6 are such that, as this process proceeds, the images which are formed on the paper are right way round images, i.e. images immediately readable in the normal way; this process is particularly illustrated in FIG. 5. The printing continues until the end of the printing line, when the printing head 4 reaches the second position to the right as shown by solid lines in FIG. 1 (which is detected by a second limit switch, also not shown in the figures), and then the printing process (i.e. the heating up of the thermal dot generating elements 5) is suspended and the printing head 4 is rapidly brought back leftwards from the second position to the first position while simultaneously the printing paper is advanced by rotation of the platen 3 by a predetermined amount in the direction perpendicular to the primary scanning direction, i.e. vertically which hereinafter will be called the secondary scanning direction. Then the printing process is repeated for the next line. Thus, in this normal printing mode, the pattern for scanning the printing paper is as shown in FIG. 3.

Figure 4:
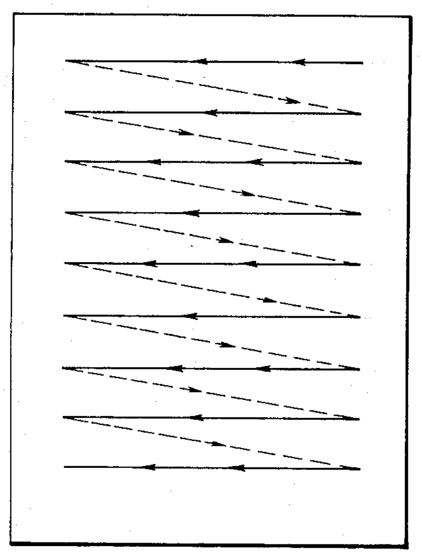
FIG. 4 is an illustrative diagram, similar to FIG. 3, showing the movement of the printing head of the printer of FIG. 1 with respect to paper (or a stencil sheet) fitted thereinto, during reverse printing when a mirror image is being formed.

On the other hand, when the operational mode switch 10 is manually set by the operator of the typewriter to its position for reverse printing mode, in which case the sheet which is fed into the typewriter and is present between the platen 3 and the printing head 4 is typically a heat sensitive thermal stencil sheet of the sort described earlier, then after the "carrier return" key on the keyboard 1 is pressed the printing head 4 is set to its second position on the right as shown in FIG. 1 by the solid lines (which is controlled by the second limit switch), and as the printing process of a line proceeds the printing head 4 is moved from the right to the left along the primary scanning direction (i.e. horizontally) with again the thermal dot generating elements 5 being selectively and appropriately heated up by supply of electrical current thereto from the latch circuit 7 in exactly the same timings and combinations as in the case of the normal type right way round printing described above. This motion of the printing head 4 is now accomplished by the scanning control circuit 9 supplying actuating electrical energy to the reverse motion terminal of the scanning motor 8 (which may be accomplished by the switch 10 simply switching over the supply of electrical energy between the forward and reverse motion terminals of said scanning motor 8), so as to drive the printing head 4 at the same predetermined speed along the printing line on the printing sheet as before, but in the reverse direction. It will be easily understood from these descriptions that, as this process proceeds, the images which are formed on the paper will be reverse images, i.e. mirror images, of the images which were formed in the case of the normal type printing described above. This process is particularly illustrated in FIG. 6. The printing continues until the end of the printing line, when the printing head 4 reaches the first position to the left as shown by dashed lines in FIG. 1 (which is detected by the aforementioned first limit switch, not shown), and then as before the printing process (i.e. the heating up of the thermal dot generating elements 5) is suspended and the printing head 4 is rapidly brought back, in this case rightwards from the first position to the second position while simultaneously as before the printing paper is advanced by rotation of the platen 3 by a predetermined amount in the secondary scanning direction. Then the printing process is repeated for the next line. Thus, in this reverse printing mode, the pattern for scanning the printing paper is as shown in FIG. 4, and mirror image characters are produced thereon in the reverse spatial order to that produced in the normal printing mode.

However, when the latching circuit 7 is so constructed as to be able to retain the series of dot matrix pattern information signals for the line base, by further incorporating a relatively simple electronic circuit for selectively reversing the direction of sequential outputting of a series of electronic digital information signals in opposite directions, the mirror image printing is obtained by switching over the signal reversing electronic circuit without changing over the scanning direction of the thermal printing head 4.

Figure 7:
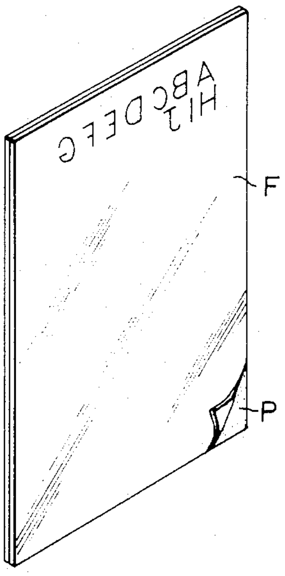
FIG. 7 is an illustrative perspective view of a heat sensitive stencil sheet as used for stencil printing, which has been formed with a mirror image of certain alphabetic characters by reverse printing.

FIG. 7 shows an example of a heat sensitive stencil sheet suitable for being prepared by this typewriter operating in this reverse printing mode. This stencil sheet is a layered stencil, and consists of a thermoplastic film F of the type described earlier and an ink porous laminar body P made of Japanese paper adhered to one side of the thermoplastic film F. When the stencil sheet is inserted into the typewriter described above with the porous laminar body P on the side of the platen 3 and the thermoplastic film F on the side of the printing head 4, and the typewriter is operated in the reverse operational mode as explained above, then the thermoplastic film F locally disappears at the places where the thermal dot generating elements 5 are heated up, to leave only the porous laminar body P in these places, and this process produces mirror image characters as indicated in the figure. And subsequently the stencil sheet can be mounted in a stencil printing machine (not shown in the figures) with the thermoplastic film F pressed against paper which is to be printed upon, and ink can be spread on the stencil sheet on the side of the porous laminar body P, and this process will produce printed characters on the paper to be printed upon which are the right way round, i.e. are not reversed. This illustrates the requirement for having the characters printed on the stencil sheet by the typewriter of FIG. 1 to be reverse or mirror image characters, and is the motivation for the devising of the thermal printing system of the present invention.

Figure 8:
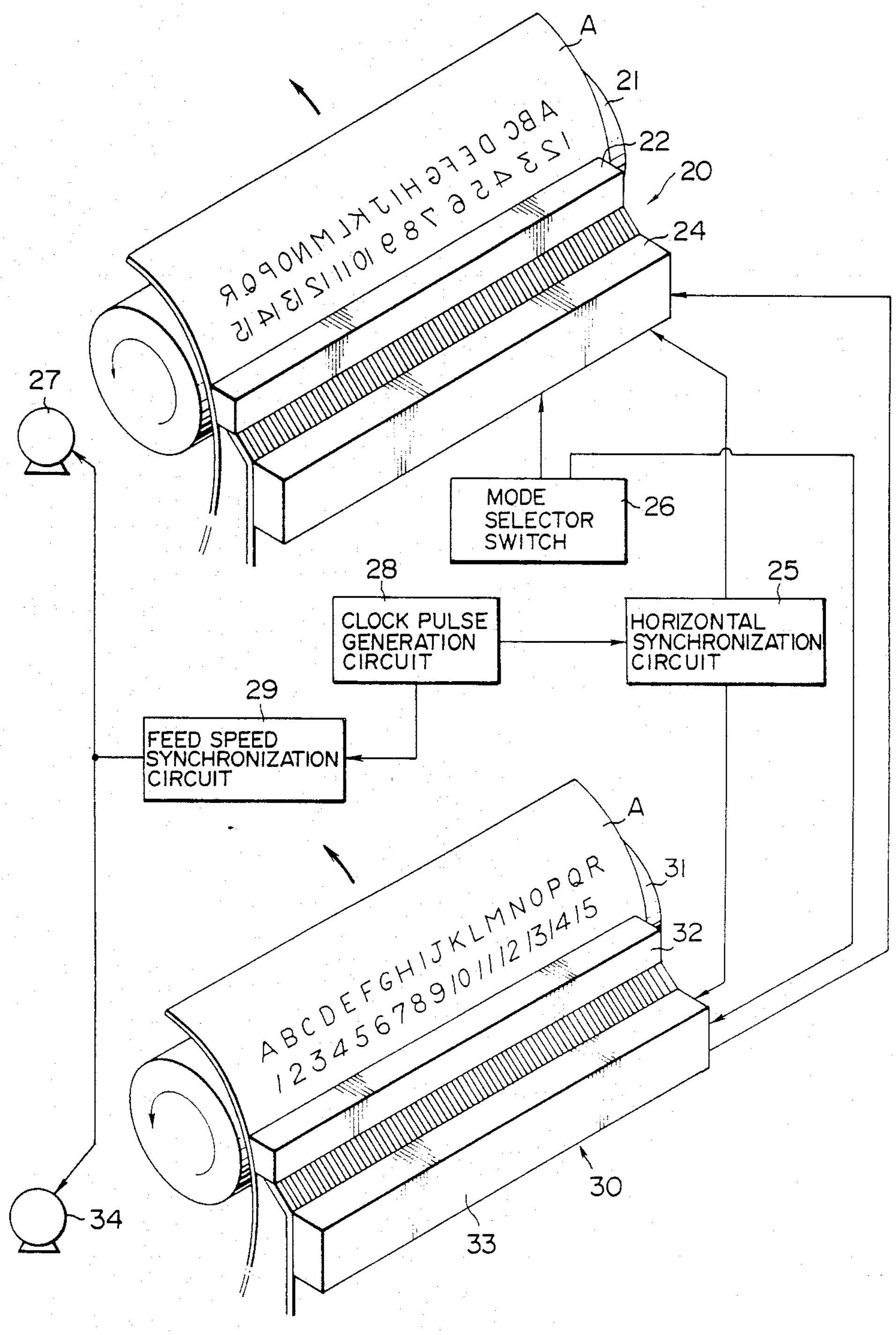
FIG. 8 is a schematic perspective view of the essential parts of a copying device incorporating a thermal printer, which is a second preferred embodiment of the thermal printing system of the present invention, also showing by blocks certain of the elements of the control system therefor.

FIG. 8 shows the essential parts of a copying device incorporating a thermal printer, which is a second preferred embodiment of the thermal printing system of the present invention in which the scanning along the primary scanning direction is performed electronically rather than mechanically. In this embodiment, a thermal printer unit 20 forms images according to information signals received from a photoelectric reading device 30. As a matter of course, the images may be magnified or reduced.

Figure 9:
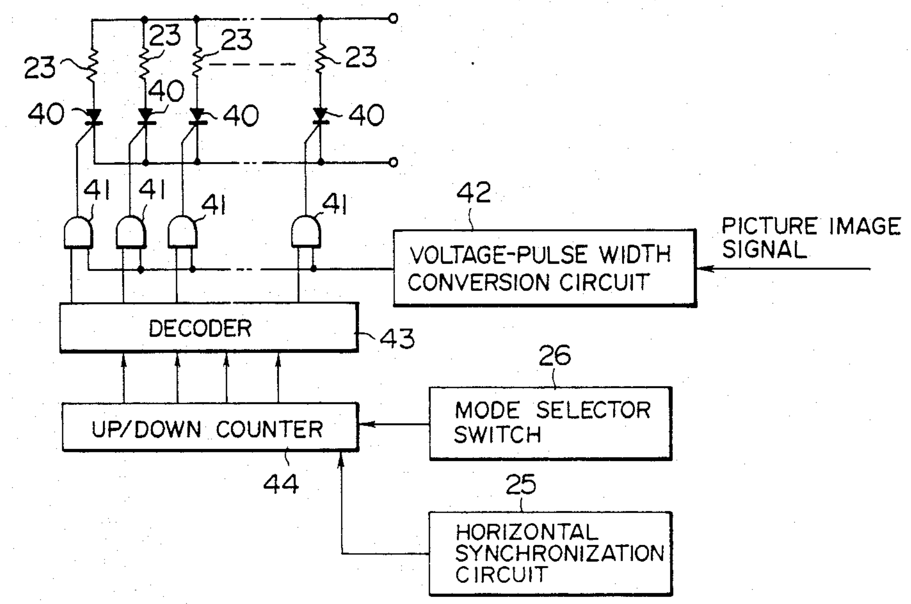
FIG. 9 is a block diagram of a control system incorporated in the copying device of FIG. 8.
Figure 10:
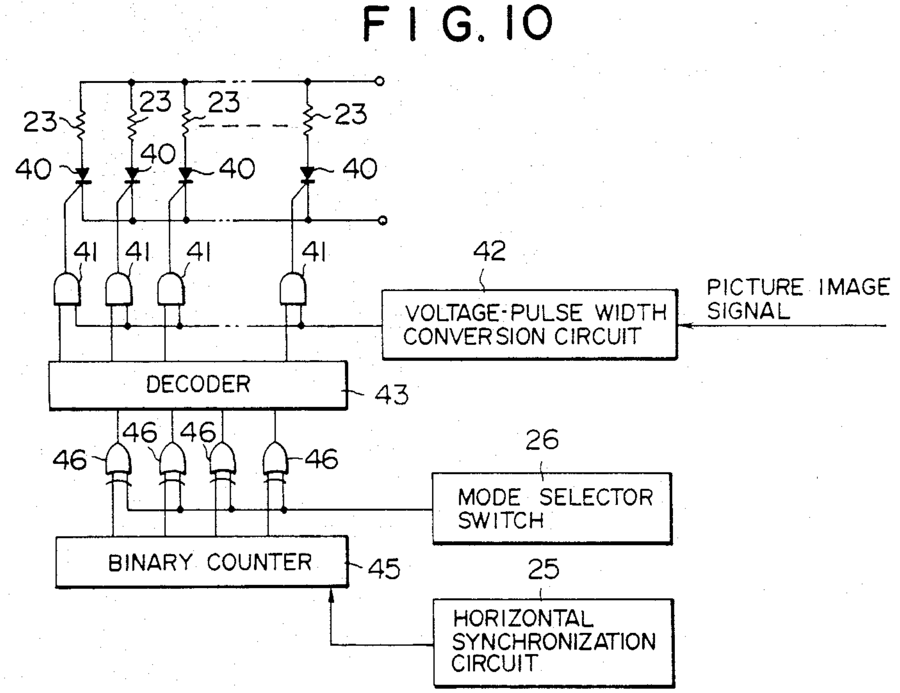
FIG. 10 is a block diagram of an alternative construction for this control system, suitable for being incorporated in another copying device which is a third preferred embodiment of the thermal printing system of the present invention.

In the thermal printer unit 20, a cylindrical platen 21 extends along the lateral direction, and a thermal printing head 22 of a per se well known sort also extends along said lateral direction, parallel to and opposing a generatrix of the cylindrical surface of said platen 21, between a first position on the left as seen in FIG. 8 and a second position on the right; this direction will hereinafter be called the primary scanning direction for printing of the printing head 22. In this second embodiment, the printing head 22 does not physically move; in fact, the printing head 22 is made up of a plurality (in fact a large plurality) of thermal dot generating elements 23 (as shown in FIGS. 9 and 10 and as described below) arranged at equal and fine intervals horizontally as seen in the figure, i.e., along a generatrix of the cylindrical surface of the platen 21 and thus along the primary scanning direction for printing, and, in this embodiment, extending all along the printing line. Selective supply of electrical energy to these thermal dot generating elements 23 is provided from a control system 24 which is schematically illustrated in FIG. 9, and when such electrical energy is supplied to one of the dot generating elements 23 said element 23 very quickly becomes hot and causes a mark to be thermally impressed on a corresponding position of a sheet wrapped around the platen 21 and opposed to the head 22 and the elements 23, as will be explained later.

The control system 24 receives supply of: a horizontal scan synchronization signal from a horizontal synchronization circuit 25, a picture image signal from the photoelectric reading device 30, and a direction signal indicating the direction of scanning from a mode selector switch 26 which is manually controlled by the operator. The horizontal scan synchronization signal from the horizontal synchronization circuit 25 is also supplied to the photoelectric reading device 30 to control its scanning process in reading.

In the photoelectric reading device 30, a cylindrical platen 31 extends along the lateral direction (i.e. the primary scanning direction for reading), and a photoelectric reading head 32 of a per se well known sort also extends along said lateral direction, parallel to and opposing a generatrix of the cylindrical surface of said platen 31, between a first position on the left as seen in FIG. 8 and a second position on the right. The photoelectric reading head 32 is made up of a plurality (in fact a large plurality) of photoelectric reading elements (not particularly shown in the figures) arranged at equal and fine intervals horizontally as seen in the figure, i.e., along a generatrix of the cylindrical surface of the platen 31 and thus along the primary scanning direction for reading. A reading original A inscribed on a sheet such as a paper sheet is fed in between the photoelectric reading head 32 and the platen 31, and the photoelectric reading elements closely oppose the patterns on said reading original A. Drive motors 27 and 34 are provided for rotating, respectively, the platen 21 of the thermal printer unit 20 and the platen 31 of the photoelectric reading device 30, so as respectively to drive the printing sheet B (which is fed in between the photoelectric reading head 22 and the platen 21) and the reading original A in the secondary scanning directions for printing and reading which are perpendicular to the respective primary scanning directions. These drive motors 27 and 34 are driven in synchronism by a feed speed synchronization circuit 29 which is activated by clock pulses supplied from a clock pulse generation circuit 28, which also controls the horizontal synchronization circuit 25.

As the reading original A and the printing sheet B are thus driven in synchronism in their secondary scanning directions, under control of the horizontal scan synchronization signal from the horizontal synchronization circuit 25 successive ones of the photoelectric reading elements are polled in rapid succession in a particular scanning direction, i.e. are electronically scanned, and values representative of their output signals, which are proportional to the intensities of the light they are receiving, i.e. to the brightnesses of the closely corresponding portions of the reading original A, are supplied in succession to constitute the picture image signal. Simultaneously, under the control also of the horizontal scan synchronization signal, this picture image signal, which is received by the control circuit 24, is supplied in turn to successive ones of the thermal dot generating elements 23, again in rapid succession in a particular scanning direction, so that these thermal dot generating elements 23 inscribe a pattern on the printing sheet B which corresponds to that on the reading original A.

Particularly according to the concept of the present invention, the relative sense of the scanning direction of the photoelectric reading elements in the photoelectric reading device 30 and the scanning direction of the thermal dot generating elements 23 in the thermal printer unit 20 is controlled by the mode selector switch 26. Thus, when said selector switch 26 is set to a position for normal copying, then the scanning direction of the photoelectric reading elements and the scanning direction of the thermal dot generating elements 23 are both set to be the same, for example are both set to be left to right; but when on the other hand said selector switch 26 is set to a position for reverse copying, then the scanning direction of the photoelectric reading elements and the scanning direction of the thermal dot generating elements 23 are set to be opposite: for example, the scanning direction of the photoelectric reading elements is set to be left to right and the scanning direction of the thermal dot generating elements 23 is set to be right to left, or, as another example, the scanning direction of the photoelectric reading elements is set as reversed to be right to left while the scanning direction of the thermal dot generating elements 23 is set to be left to right. It will be readily understood, based upon the foregoing explanation and upon analogy with the first preferred embodiment of the present invention described above, that according to the positioning of this selector switch 26 the copy made on the printing sheet B is either a direct normal copy of the image on the reading original A or is a reverse or mirror image copy thereof. Typically, in the case of a normal copy being made, the printing sheet B is a piece of thermal paper for direct hard copy use, while in the case of a reverse copy being made the printing sheet B is a stencil sheet of the type described earlier herein for perforation for printing multiple copies. Thus, the shown copying device can be used for making either direct or reverse copies, by simple operation of the mode selector switch 26.

FIG. 9 shows a possible construction for the control circuit 24. A semiconductor switch 40 is connected to each of the thermal dot generating elements 23 in series, and a voltage is applied to these series combinations, so that whenever an ON signal is supplied to the gate terminal of any one of the semiconductor switches 40 the corresponding thermal dot generating element 23 is provided with electrical energy, causing it to generate heat instantaneously. Each of the gate terminals of each of the semiconductor switches 40 is supplied with the output of a corresponding AND gate 41. One of the inputs of each of these AND gates 41 receives supply of an ON/OFF signal which is common to all the AND gates 41 and is based on the picture image signal and is outputted from a voltage - pulse width conversion circuit 42, and the other of the inputs of each of the AND gates 41 receives an input from a decoder 43. The decoder 43 receives a scanning signal from an up/down counter 44 so as to output an ON signal to each of the AND gates 41 in turn in a sequential manner. As a result, an ON/OFF signal according to the value of the picture image signal is sequentially given to the gate terminal of each of the semiconductor switches 40 in turn, i.e. this ON/OFF signal is electronically and scanningly distributed to the gate terminals of the semiconductor switches 40 in series, whereby the thermal dot generating elements 23 sequentially and selectively generate heat by being supplied with electrical energy. The count time of the up/down counter 44 or in other words the electronic scanning speed is determined according to the clock pulse signal from the horizontal synchronization circuit 25. And, according to the present invention, the up/down counter 44 is switched between counting upwards and counting downwards by a signal supplied from the mode selector switch 26, so that (exemplarily) when the mode selector switch 26 is set to a position denoting the normal printing mode the up/down counter 44 counts upwards and the scanning direction of the photoelectric reading elements and the scanning direction of the thermal dot generating elements 23 are both set to be the same and normal right way round copying is performed, while on the other hand when the mode selector switch 26 is set to a position denoting the reverse printing or stencil cutting mode the up/down counter 44 counts downwards and the scanning direction of the photoelectric reading elements and the scanning direction of the thermal dot generating elements 23 are set to be opposite and reverse or mirror image copying is performed. Thus, in this second preferred embodiment also, by selectively setting the mode selection switch 26, either normal right way round copy printing or reverse mirror image copy printing can be selectively provided by the thermal printing system.

FIG. 10 shows a possible construction for the control circuit 24 in a third preferred embodiment of the present invention; in this figure, parts which correspond to parts of the circuit of FIG. 9 and which have the same functions are denoted by the same reference numerals. In this third embodiment, a binary counter 45 is used instead of the up/down counter 44 of the second embodiment. A plurality of output terminals of the binary counter 45 are connected to a plurality of input terminals of a decoder 43 by way of NOR gates 46. The NOR gates 46 each receive a signal from the binary counter 45, and also receive the mode selection signal from the mode selection switch 26. The mode selection switch 26 outputs an ON signal to the NOR gates 46 when it is set to the direct copy printing mode, and on the other hand outputs an OFF signal to the NOR gates 46 when it is set to the reverse copy printing mode. Thus, this signal from the mode selection switch 26 in effect controls whether the signal supplied to the AND gates 41 by the combination of the binary counter 45 and the NOR gates 46 increments or decrements. Therefore, in this embodiment also, by selectively setting the mode selection switch 26, either normal right way round copy printing or reverse mirror image copy printing can be selectively provided by the thermal printing system.

Although the present invention has been shown and described with reference to the preferred embodiments thereof, and in terms of the illustrative drawings, it should not be considered as limited thereby. Various possible modifications, omissions, and alterations could be conceived of by one skilled in the art to the form and the content of any particular embodiment, without departing from the scope of the present invention. Therefore it is desired that the scope of the present invention, and of the protection sought to be granted by Letters Patent, should be defined not by any of the perhaps purely fortuitous details of the shown preferred embodiments, or of the drawings, but solely by the scope of the appended claims, which follow.

What is claimed is:

1. A thermal printing system for printing in either normal image forming mode or reversed mirror image forming mode, comprising:

a system for coding a total printing area as a matrix of dot areas substantially closely arranged in two dimensional directions along an abscissa and an ordinate, said dot areas each being so small that any figure to be printed by normal use of said thermal printing system is expressed by a particular combination of a plurality of said dot areas in said matrix;

a plurality of thermal dot generating means which, when actuated, provide heat at selected ones of said dot areas in said matrix;

a means for receiving input information for printing;

a means for decoding said input information for printing into a series of digital printing signals, each of which determines actuation or non-actuation of said thermal dot generating means, according to an order of scanning which scans the dot areas of said matrix, said order being sequential with respect to at least one of said two dimensional directions so that every dot area which belongs to a certain position of said abscissa alternatively ordinate is scanned after every dot area which belongs to a position adjacently preceding to said certain position of said abscissa alternatively ordinate has been scanned but before every dot area which belongs to a position adjacently succeeding to said certain position of said abscissa alternatively ordinate is scanned;

a means for actuating said thermal dot generating means according to said series of digital printing signals according to an order of scanning which scans the dot areas of said matrix, said order being sequential with respect to at least one of said two dimensional directions so that every dot area which belongs to a certain position of said abscissa alternatively ordinate is scanned after every dot area which belongs to a position adjacently preceding to said certain position of said abscissa alternatively ordinate has been scanned but before every dot area which belongs to a position adjacently succeeding to said certain position of said abscissa alternatively ordinate is scanned; and a means for controlling at least one of said order of scanning performed by said means for actuating said thermal dot generating means and said order of scanning performed by said means for decoding said input information for printing so as to selectively reverse the relative order of scanning performed by said means for actuating said thermal dot generating means to said order of scanning performed by said means for decoding said input information for printing at least with respect to the sequence with respect to said one of said dimensional directions.

2. A thermal printing system according to claim 1, wherein said means for receiving input information for printing includes a set of keys arranged to provide a typewriting key board for operation by hand fingers, and said order of scanning performed by said means for actuating said thermal dot generating means is from left to right in the normal image forming mode and from right to left in the reversed mirror image forming mode.

3. A thermal printing system according to claim 2, wherein said plurality of thermal dot generating means include a plurality of thermal dot generating means arranged in a single line along said ordinate, said order of scanning performed by said means for actuating said thermal dot generating means being proceeded left to right or right to left along said abscissa.

4. A thermal printing system according to claim 1, wherein said means for receiving input information for printing includes a photoelectric reading device having a plurality of photoelectric reading elements, and said order of scanning performed by said means for actuating said thermal dot generating means and said order of scanning performed by said means for decoding said input information for printing are made to be the same as one another along said abscissa in the normal image forming mode, while said order of scanning performed by said means for actuating said thermal dot generating means and said order of scanning performed by said means for decoding said input information for printing are made to be reversed to one another in the reversed mirror image forming mode.

5. A thermal printing system according to claim 4, wherein said means for actuating said thermal dot generating means comprises an up/down counter which is selectively operated to count up or count down according to a switching over operation by said control means.

6. A thermal printing system according to claim 4, wherein said means for actuating said thermal dot generating means comprises a combination of a binary counter and a plurality of NOR gates which is selectively operated to shift sequential switching between two opposite directions according to a switching over operation of said control means.

* * * * *